(87.)
JAMES HARPER.
Improvement in Lubricators for Steam Engines.
No. 121,779. Patented Dec. 12, 1871.
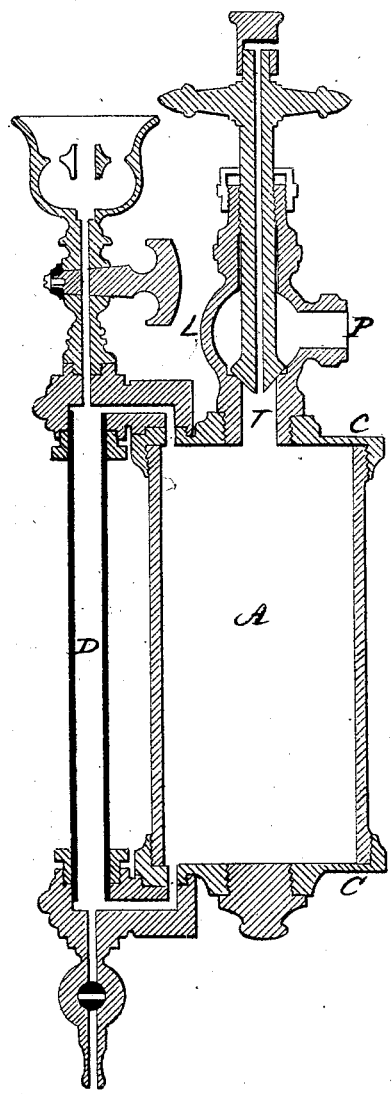
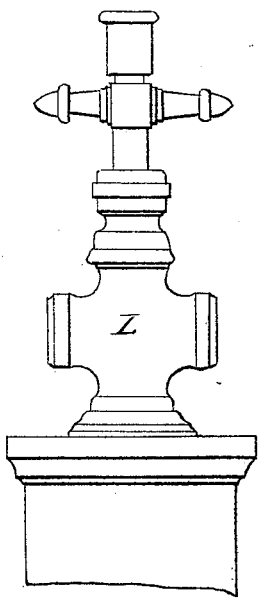
Witnesses
James Harper
Inventor
By his Atty.

121,779

UNITED STATES PATENT OFFICE.

JAMES HARPER, OF NEW HAVEN, CONNECTICUT.

IMPROVEMENT IN LUBRICATORS FOR STEAM-ENGINES.

Specification forming part of Letters Patent No. 121,779, dated December 12, 1871.

*To all whom it may concern:*

Be it known that I, JAMES HARPER, of New Haven, in the county of New Haven and State of Connecticut, have invented a new Improvement in Lubricator for Steam-Engines; and I do hereby declare the following, when taken in connection with the accompanying drawing and the letters of reference marked thereon, to be a full, clear, and exact description of the same, and which said drawing constitutes part of this specification and represents, in—

Figure 1, a vertical central section illustrating my improvement; and in Fig. 2, a side of the lubricator as patented to me September 26, 1871.

This invention relates to an improvement in lubricators for steam-engines for which Letters Patent were granted to me September 26, 1871. In that patent the oil was taken up by the steam passing through the valve—that is to say, the construction and connection of the lubricator was such as to require that it be placed in a pipe through which the steam passed to the engine, the lubrication being produced by circulation. The object of this invention is to adapt the lubricator for attachment to the steam-chest independent of the steam-pipe by simply a tube from the chest terminating at the lubricator, whereby the steam at the end of each stroke sets back into the tube, performing the action known as pulsation; hence, instead of circulation I now employ pulsation; and this improvement adapts my lubricator to all places where such pulsation occurs.

A is the lubricating-chamber; B, the upper, and C the lower head; D, the glass tube; and T, the passage from the chamber to the valve, in their immediate connections, the same as in my patent before referred to. Instead of the valve L, as in Fig. 2, constructed to receive the pipe on one side and a corresponding pipe on the other to permit the steam to flow directly through, I construct the valve L, as seen in Fig. 1, with a single opening, P. Into this I introduce a tube, which leads to the steam-chest or other position from which the pulsation is produced, and the steam enters the valve and condenses, as before described, causing the oil in the chamber to rise and mingle with the steam which, by pulsation, is injected into the valve L, returning with the steam, on its reaction, to the steam-chest, and, this pulsation continuing, the chamber A is gradually filled and the oil taken therefrom. This result is attained, in my lubricator as patented, by plugging up one of the openings in the valve to prevent the circulation. This done, the lubricator may be applied in the same manner as I have described for this improvement. A vent-cock should be inserted at some point in the valve L to allow the air therein to escape.

I claim as my invention—

In combination with the chamber A and passage T with its valve, the chamber L connecting with the said chamber A, and provided with a single opening, P, to allow the steam to enter and return by the same passage, substantially as set forth.

JAMES HARPER.

Witnesses:
JOHN H. SHUMWAY,
A. J. TIBBITS. (87)